United States Patent
Sohn

(10) Patent No.: US 8,703,313 B2
(45) Date of Patent: Apr. 22, 2014

(54) SEPARATOR FOR BATTERY

(76) Inventor: Chun Shig Sohn, Waterloo (CA)

( * ) Notice: Subject to any disclaimer, the term of this patent is extended or adjusted under 35 U.S.C. 154(b) by 483 days.

(21) Appl. No.: 12/762,500

(22) Filed: Apr. 19, 2010

(65) Prior Publication Data

US 2011/0256441 A1     Oct. 20, 2011

(51) Int. Cl.
*H01M 2/38* (2006.01)
*H01M 2/00* (2006.01)

(52) U.S. Cl.
USPC .............................. 429/67; 429/61

(58) Field of Classification Search
USPC ....................................... 429/67, 70
See application file for complete search history.

(56) References Cited

U.S. PATENT DOCUMENTS

| | | | |
|---|---|---|---|
| 3,494,796 A * | 2/1970 | Grulke et al. | 429/127 |
| 4,112,202 A | 9/1978 | Hug et al. | |
| 4,565,002 A | 1/1986 | Matsuo et al. | |
| 5,512,384 A * | 4/1996 | Celeste et al. | 429/51 |
| 5,554,452 A * | 9/1996 | Delmolino et al. | 429/10 |
| 5,560,999 A * | 10/1996 | Pedicini et al. | 429/407 |
| 6,835,491 B2 * | 12/2004 | Gartstein et al. | 429/92 |
| 2005/0017686 A1 * | 1/2005 | Sakakibara et al. | 320/132 |
| 2006/0105244 A1 | 5/2006 | Kejha et al. | |
| 2007/0105014 A1 | 5/2007 | Shin et al. | |
| 2009/0311588 A1 | 12/2009 | Lim et al. | |

FOREIGN PATENT DOCUMENTS

| | | |
|---|---|---|
| JP | 04-349348 | 12/1992 |
| KR | 1020090061571 A | 6/2009 |
| WO | WO 2010/087123 | 8/2010 |

OTHER PUBLICATIONS

Richard S. Baldwin "A Review of State-of-the-Art Separator Materials for Advanced Lithium-Based Batteries for Future Aerospace Missions" NASA/TM-2009-215590, Mar. 2009 [Online: http://gltrs.grc.nasa.gov].

BLOG post by User youngfamily "various cells" posted Nov. 15, 2004 with response posted by User lovehjkw Nov. 15, 2004 [Online: http://ask.nate.com/qna/view.html?n=4559463].

International Search Report and Written Opinion from International Application No. PCT/CA2010/002002 dated Apr. 7, 2011.

* cited by examiner

*Primary Examiner* — Barbara Gilliam
*Assistant Examiner* — Robert S Carrico
(74) *Attorney, Agent, or Firm* — Workman Nydegger

(57) ABSTRACT

Disclosed are a separator for a battery and a battery. The separator includes a porous film, a first roller, and a second roller. The first and second rollers are associated with both ends of a porous film. The first roller is wound with a portion of the porous film and is configured to rotate to unroll the film. The second roller is configured to rotate in an opposite direction to a rotary direction of the first roller to roll up the film.

27 Claims, 6 Drawing Sheets

SEPARATOR FOR BATTERY

BACKGROUND

A battery includes a separator to electrically separate a cathode and an anode. The separator separates electrodes (i.e., the cathode and anode) from each other and allows ions within the battery to flow through the separator. Accordingly, the separator prevents a short-circuit that can be resulted from a direct electronic contact between the cathode and the anode. Further, the separator affects the internal resistance, stability, cycle-life, operating temperature, and kinetic parameters such as discharge and charge rates of the battery according to the structural and physiochemical properties of the separator.

DETAILED DESCRIPTION

Figure 1:
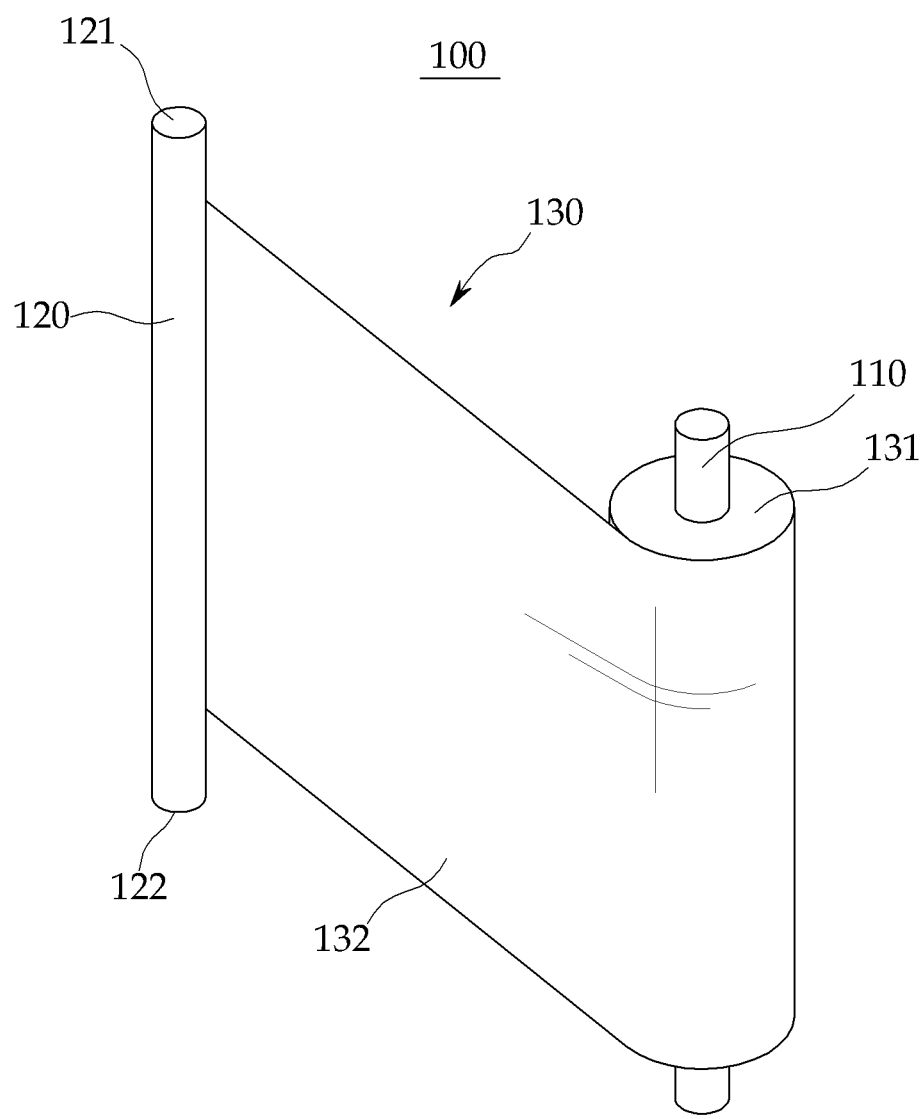
FIG. 1 shows an illustrative embodiment of a separator for a battery.

In one embodiment, a separator for a battery may include a porous film, and first and second rollers associated with both ends of the porous film. The first roller may be wound with a portion of the porous film and configured to rotate to unroll the film. The second roller may be configured to rotate to roll up the film.

Both ends of the porous film may be fixed to the first and second rollers, respectively.

The first and second rollers may cooperatively rotate such that the portion of the porous film is unwound from the first roller.

A length of the porous film rolled by the second roller may be the same as a distance between the first and second rollers.

The second roller may be configured to rotate in a same direction as a rotary direction of the first roller to roll up the film. Also, the second roller may be configured to rotate in an opposite direction to a rotary direction of the first roller to roll up the film.

The separator may further include a rotating device operably connected to the second roller to rotate the second roller with respect to the porous film.

The second roller may have one end configured to receive a torque applied from an outside to rotate the second roller.

The first and second rollers may be made of an electrochemical resistant material, respectively. The chemical resistant material may include a steel, an aluminum, a plastic, or a composite material.

The porous film may be made of at least one of a nonwoven fiber, a polymer, and an inorganic composite.

In another embodiment, a battery may include a cathode and an anode, and a separator to separate the cathode and the anode. The separator may include a porous film, and first and second rollers associated with both ends of the porous film. The first roller may be wound with a portion of the porous film and configured to rotate to unroll the film. The second roller may be configured to rotate to roll up the film.

The battery may further include a rotating device operably connected to the second roller to rotate the second roller with respect to the porous film.

The battery may further include a sensor configured to detect a clogging value for the unrolled porous film placed between the first roller and the second roller.

The clogging value may be a difference value between a desired voltage for the battery and a voltage generated by the battery.

The second roller may roll up the porous film when the sensor detects that the clogging value exceeds a reference value.

The battery may further include a case to contain the cathode, the anode, and the separator.

The case may include a first seal and a second seal to surround the first roller and the second roller, respectively, to prevent an electrolyte contained in the case from passing through between the first and second rollers and the case.

The case may have an opening through which one end of the second roller is exposed to an outside.

The case may further include a third seal to prevent an electrolyte contained in the case from leaking through the opening.

In the following detailed description, reference is made to the accompanying drawings, which form a portion hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 shows an illustrative embodiment of a separator for a battery. As used herein, a battery may include any means for converting stored chemical energy into electrical energy. Also, a battery may include a primary battery to irreversibly transform chemical energy to electrical energy or a secondary battery to be recharged.

FIG. 1 illustrates a separator 100 including a porous film 130, and first and second rollers 110 and 120 associated with both ends of porous film 130. In one embodiment, porous film 130 may include a rolled portion 131 and an unrolled portion 132 connected to rolled portion 131. Particularly, FIG. 1 illustrates that first roller 110 is wound with rolled portion 131 of porous film 130, and second roller 120 is associated with unrolled portion 132. Since second roller 120 may be associated with one end of unrolled portion 132 which is opposite to the other end connected to rolled portion 131, second roller 120 may be spaced from first roller 110 in parallel, as far as a width of unrolled portion 132

In one embodiment, first roller 110 may be wound with rolled portion 131 of porous film 130 and configured to rotate to unroll rolled portion 131 of porous film 130. Second roller 120 may be configured to rotate to roll up unrolled portion 132 of porous film 130. First and second rollers 110 and 120 may cooperatively rotate such that rolled portion 131 of porous film 130 is unwound from first roller 110, and that unrolled portion 132 of porous film 130 is wound with second roller 120. The rotations of first and second rollers 110 and 120 will be described in detail hereinafter.

In one embodiment, either or both of first and second rollers 110 and 120 may include a ratchet (not shown) to allow the rotation of first or second roller 110 or 120 in only one rotary direction and prevent the rotation of first or second roller 110 or 120 in the opposite rotary direction. For example, the ratchet may be provided on second roller 120 to rotate together with second roller 120 and engage with a pawl provided at a case (not shown) containing separate 100. The ratchet may have teeth each having a moderate slope and a steep slope. When the ratchet rotates in one rotary direction, the pawl slides on the moderate slopes of the teeth. When the ratchet rotates in the opposite rotary direction, the pawl presses against the steep slope of one tooth to prevent the rotation of the ratchet, thereby preventing the rotation of the second roller 120.

In one embodiment, first and second rollers 110 and 120 may be made of an electrochemical resistant material to prevent first and second rollers 110 and 120 from being damaged by electrochemical reactions occurred in a battery in which first and second rollers 110 and 120 are included. The electrochemical resistant material may include a steel, an aluminum, a plastic, or a composite material, without limitation.

First and second rollers 110 and 120 are associated with both ends of the porous film 130. In one embodiment, both ends of porous film 130 may be fixed to first and second rollers 110 and 120, respectively. FIG. 1 illustrates that one end of porous film 130 (for example, one end of rolled portion 131 of porous film 130) is placed on and fixed to a surface of first roller 110 in a longitudinal direction of first roller 110. FIG. 1 further illustrates that the other end of porous film 130 (for example, one end of unrolled portion 132 of porous film 130 which is not connected to rolled portion 131 of porous film 130) is placed on and fixed to a surface of second roller 120 in a longitudinal direction of second roller 120. Since both ends of porous film 130 are fixed to first and second rollers 110 and 120, porous film 130 can roll or unroll as first and second rollers 110 and 120 rotate.

In another embodiment, both ends of porous film 130 may be attached to first and second rollers 110 and 120, respectively, by an adhesive. A surface of one end of porous film 130 may be applied with the adhesive and attached to the surface of first roller 110. A surface of the other end of porous film 130 may be also applied with the adhesive and attached to the surface of second roller 120. The adhesive may include a material, such as polyvinylidene fluoride or polyvinyl alcohol, which does not affect electrochemical reactions in the battery.

In still another embodiment, both ends of porous film 130 may be fixed to first and second rollers 110 and 120, respectively, by fitting. For example, each of first and second rollers 110 and 120 may have a slit (not shown) to be fitted with each end of porous film 130. The slit may be provided in a longitudinal direction of first and second rollers 110 and 120 and a length of the slit may be substantially identical to the length of the end of porous film 130. The slit of first roller 110 and the slit of second roller 120 can hold both ends of porous film 130, respectively, such that porous film 130 is not separated from first and second rollers 110 and 120.

In still further another embodiment, both ends of porous film 130 may be fixed to first and second rollers 110 and 120, respectively, by heat welding. When heat is applied to both ends of porous film 130, both ends of porous film 130 may melt to be welded and fixed to first and second rollers 110 and 120.

Porous film 130 may have a multiple number of pores (not shown) through which charges pass. Porous film 130 may be made of at least one of a nonwoven fiber, a polymer, and an inorganic composite. The thickness of porous film 130 may be less than about 30 µm or between about 10 to 30 µm. The size of one pore in porous film 130 may be about 0.1 to 2 µm or about 0.1 to 1 µm.

In one embodiment, separator 100 may further include a rotating device (not shown) operably connected to second roller 120 to rotate second roller 120 with respect to porous film 130. The rotating device may be placed on either or both of ends 121 and 122 of second roller 120 and mechanically coupled to second roller 120. The rotating device may rotate second roller 120 about a central axis of second roller 120. The rotating device may be powered by a battery having separator 100 or any external power source.

In one embodiment, second roller 120 may receive a torque at either or both of ends 121 and 122 from an outside to rotate second roller 120. End 121 or 122 of second roller 120 may have a recess capable of being engaged with an external tool, such as a screwdriver. Users or external equipments can engage the external tool with the recess on one end 121 or 122 of second roller 120 and rotate second roller 120 about its central axis to roll up porous film 130.

In one embodiment, the rotating device may receive a torque from an outside to rotate second roller 120. For example, the rotating device may have a recess capable of being engaged with an external tool. Users or external equipments can engage the external tool with the recess of the rotating device and rotate the rotating device, thereby rotating second roller 120. Therefore, the rotating device may be operated by an electrical power supplied from the battery having separator 100 or any external power source, or also operated by the torque from an outside.

One operation cycle of separator 100 will be described hereinafter with reference to FIGS. 2A and 2B. As used herein, one operation cycle of separator 100 can refer to one cycle in which first and second rollers 110 and 120 cooperatively rotate to replace partially or entirely unrolled portion 132 of porous film 130 with rolled portion 131 of porous film 130.

Figure 2A:
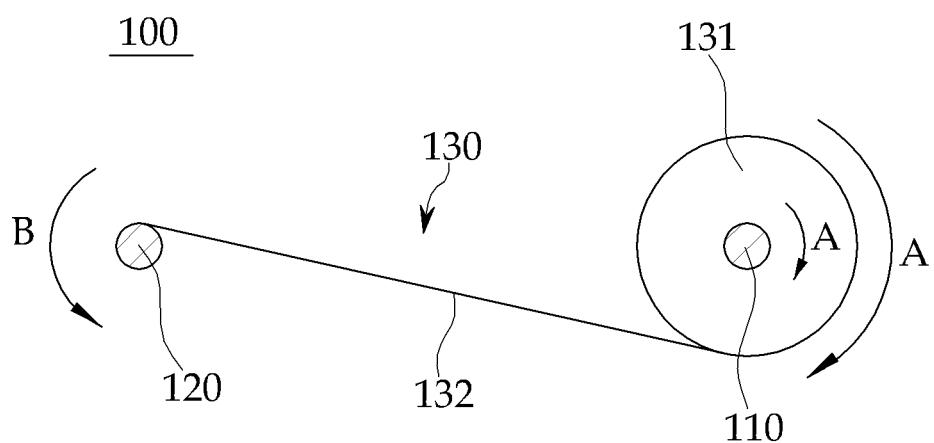
FIGS. 2A and 2B are top views of the separator of FIG. 1.
Figure 2B:
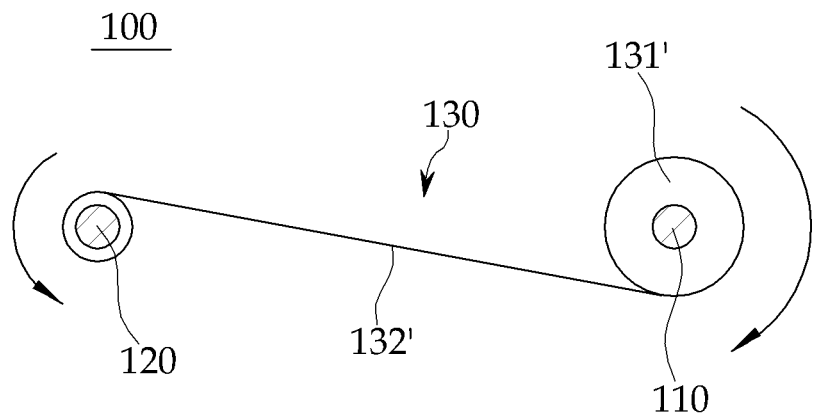

FIGS. 2A and 2B are top views of separator 100 of FIG. 1. FIGS. 2A and 2B illustrate separator 100 including first roller 110, second roller 120 spaced apart from first roller 110, and porous film 130 connecting first roller 110 with second roller 120.

In FIG. 2A, one end of porous film 130 (for example, one end of rolled portion 131) is fixed to first roller 110. Rolled portion 131 of porous film 130 is wound around first roller 110 in one direction (for example, a clockwise direction "A"). First roller 110 is configured to rotate about its central axis in the same direction as the rolled direction "A" of rolled portion 131 such that rolled portion 131 of porous film 130 can be unrolled as first roller 110 rotates in direction "A".

The other end of porous film 130 (for example, one end of unrolled portion 132 not connected to rolled portion 131) is fixed to second roller 120 such that the other end of porous film 130 can rotate together with second roller 120 as second roller 120 rotates about its central axis. Second roller 120 may rotate in an opposite direction "B" to the rolled direction "A" of portion 131, which is the same direction as the rotary direction "A" of first roller 110.

When unrolled portion 132 of porous film 130 (which is placed between first and second rollers 110 and 120) is replaced with rolled portion 131 of porous film 130, second roller 120 may rotate to draw unrolled portion 132 toward second roller 120. For example, second roller 120 can rotate in counterclockwise direction "B" as shown in FIG. 2A. Second roller 120 can rotate in response to a rotating force provided from the rotating device or a torque applied to one end (for example, end 121 or 122 of FIG. 1) of second roller 120, as described above.

When second roller 120 rotates and draws unrolled portion 132 toward second roller 120 in response to the rotating force, the force can be transferred to first roller 110 through unrolled portion 132 because unrolled portion 132 is connected with rolled portion 131 one end of which is fixed to first roller 110. In other words, as second roller 120 rotates, unrolled portion 132 can be wound around second roller 120, and, thus, rolled portion 131 connected to unrolled portion 132 can be drawn from first roller 110, resulting in making first roller rotates to unroll rolled portion 131. Therefore, rolled portion 131 and first roller 110 can rotate in response to the transferred power or torque via unrolled portion 132. For example, rolled portion 131 can rotate together with first roller 110 in direction "A", which is opposite to the rotary direction "B" of second roller 120, as shown in FIG. 2A. As second roller 120 rotates, unrolled portion 132 can be wound around second roller 120. Also, as first roller 110 rotates by second roller 120, rolled portion 131 can be unwound and moved toward second roller 120.

Although it is illustrated that rolled portion 131 of porous film 130 and first roller 110 rotates in clockwise direction "A" as second roller 120 rotates in counterclockwise direction "B", one of skill in the art could understand that rotations of opposite direction, that is, rotation of rolled portion 131 and first roller 110 in counterclockwise direction "B" and rotation of second roller 120 in clockwise direction "A", can be applicable.

FIG. 2B illustrates separator 100 which has replaced an entirety of unrolled portion 132 of porous film 130 with rolled portion 131 of porous film 130 in operation cycle. As described above, unrolled portion 132 may be wound by second roller 120, as second roller 120 rotates in counter-clockwise direction "B". At the same time, as first roller 110 rotates in clockwise direction "A", rolled portion 131 is unwound by first roller 110 as much as unrolled portion 132 is wound by second roller 120. Thus, a part of rolled portion 131 is unrolled from first roller 110 and provided as a new unrolled portion 132' associated between first and second rollers 110 and 120 (in FIG. 2B). Accordingly, unrolled portion 132 of porous film 130 can be replaced with new unrolled portion 132' of porous film 130 which has been rolled, but has become unrolled as a result of the rotation of first roller 110.

Since the part of rolled portion 131 has been supplied as new unrolled portion 132', a rolled portion 131' may have a length shorter than that of previous rolled portion 131 as big as the length of new unrolled portion 132' after one operation cycle. For example, in the case that an entirety of unrolled portion 132 of porous film 130 is replaced with new rolled portion 132' of porous film 130, a length of porous film 130 rolled by second roller 120 after the one operation cycle may be substantially the same as a distance between first and second rollers 110 and 120.

Figure 2C:
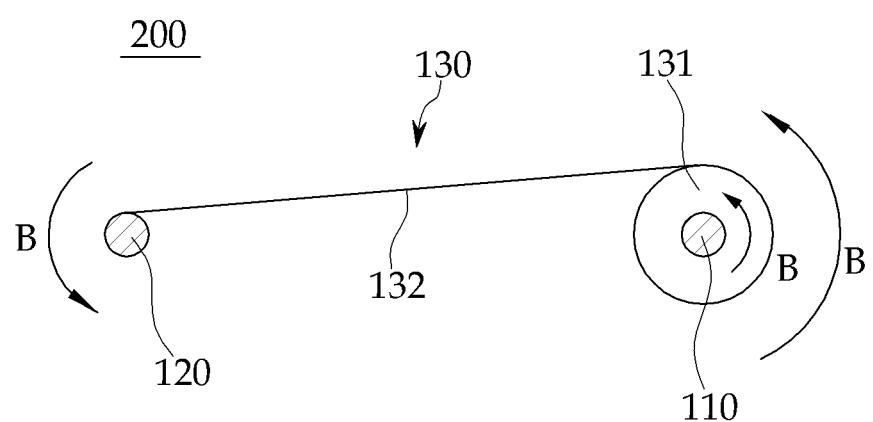
FIGS. 2C is a top view of a separator according to another illustrative embodiment.

In another embodiment, all of second roller 120, rolled portion 131, and first roller 110 may rotate in the same direction. By way of example, FIG. 2C illustrates a separator 200 in which second roller 120, rolled portion 131, and first roller 110 rotate in the same direction. If rolled portion 131 of porous film 130 is wound around first roller 110 in counter-clockwise direction "B", rolled portion 131 and first roller 110 rotate in counterclockwise direction "B" when second roller 120 rotates in counterclockwise direction "B".

In one embodiment where second roller includes the ratchet as described above, users may detect the length of porous film 130 rolled by second roller 120 during replacing unrolled portion 132 of porous film 130. Sounds or vibrations are generated by contacts between the ratchet and the pawl during the rotation of the ratchet. Since the number of occurrences of the sound or vibration depends on the rotary angle of second roller 120, users may calculate the rotary angle of second roller 120 using the number of occurrences of the sound or vibration and calculate the length of porous film 130 rolled by second roller 120 based on the relationship between a diameter of second roller 120 and the rotary angle of second roller 120. Therefore, users can easily adjust the length of porous film 130 rolled by second roller 120 using the sound or vibration generated by the ratchet and the pawl.

Figure 3:
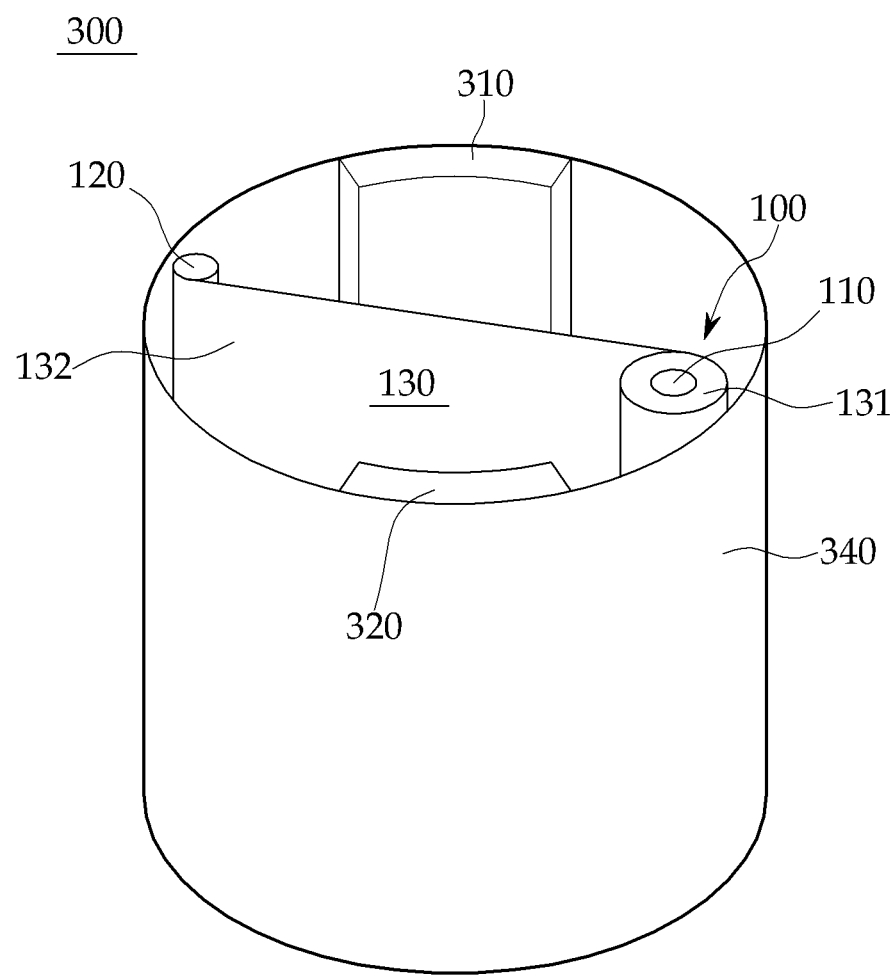
FIG. 3 shows an illustrative embodiment of a battery.

Hereinafter, an illustrative embodiment of a battery including separator 100 will be described. FIG. 3 shows an illustrative embodiment of a battery 300. FIG. 3 illustrates that battery 300 includes a cathode 310, an anode 320 and a separator 100 to separate cathode 310 and anode 320. Separator 100 includes a porous film 130, a first roller 110, and a second roller 120. The same elements as those of FIGS. 1, and 2A and 2B are denoted as the same reference numerals as FIGS. 1, and 2A and 2B and explanations on the same elements will be omitted for the simplicity of the description.

Cathode 310 and anode 320 may be provided in opposite sides with respect to separator 100. Particularly, FIG. 3 illustrates that between cathode 310 and anode 320 is provided unrolled portion 132 of porous film 130. A reduction may occur to generate cations at cathode 310 and an oxidation may occur to generate anions at anode 320. These electrochemical reactions may generate electrical power such that battery 300 supplies electrical power to electrical equipments electrically connected to battery 300. In one embodiment, the electrical power generated in battery 300 may be provided to second roller 120 to rotate second roller 120, as described above.

FIG. 3 further illustrates that battery 300 includes a case 340 to contain cathode 310, anode 320, and separator 100. An upper portion of case 340 is omitted in FIG. 3 for explanation of the elements contained in case 340. Case 340 may define an exterior surface of battery 300 and support elements (for example, cathode 310, anode 320, and separator 100) of battery 300. Case 340 may be filled with an electrolyte for electrical connection between cathode 310 and anode 320. The electrolyte may be an ionic solution of acids, bases, or salts, without limitation. Case 340 may have grooves to rotatably support first and second rollers 110 and 120 of separate 100.

Case 340 may be made of an electrochemical resistant material to prevent case 340 from being damaged by electrochemical reactions occurred in battery 300. Also, case 340 may insulate battery 300 from an outside. The material of case 340 may include a steel, an aluminum, a plastic, or a composite material, without limitation. The material of case 340 may be substantially the same as the material of first roller 110 or second roller 120.

In one embodiment, porous film 130 of separator 100 included in battery 300 may be replaced with a new porous film when a clogging of porous film 130 exceeds a threshold. Particularly, the clogging of porous film 130 may be caused by a melting of porous film 130 or an insertion of pollutant into the pores of porous film 130. The melting of porous film 130 may be caused by the heat generated during electrochemical reactions in battery 300 or supplied from an outside. Such heat may increase a temperature of battery 300, thereby melting porous film 130. The pollutants that may be inserted into the pores of porous film 130 may be included in the electrolyte or particulates from cathode 310 or anode 320. Since the clogging of porous film 130 deteriorates the performance of battery 300, the replacement of clogged porous film 130 with a new porous film prevents from the performance deterioration.

For example, if unrolled portion 132 of porous film 130 is clogged, separator 100 may replace clogged unrolled portion 132 with a new portion (for example, 132' in FIG. 2B) of porous film 130 supplied from rolled portion 131. For the replacement of the clogged porous film, second roller 120 may rotate and make first roller 110 to rotate through porous film 130. As second roller 120 rotates, clogged unrolled portion 132 may be wound around second roller 120 and rolled portion 131 may be unwound from first roller 131 to provide a new portion of porous film 130 between cathode 310 and anode 320. If a length of porous film 130 rolled by second roller 120 is substantially the same as a distance between first and second roller 110 and 120, second roller 120 may stop rotating, which result in stopping the rotation of first roller 110. Therefore, unrolled portion 132 of porous film 130 may be replaced with the new portion of porous film 130 supplied from first roller 110. The aforementioned operation may be repeated whenever the clogging of unrolled portion 132 occurs.

Figure 4A:
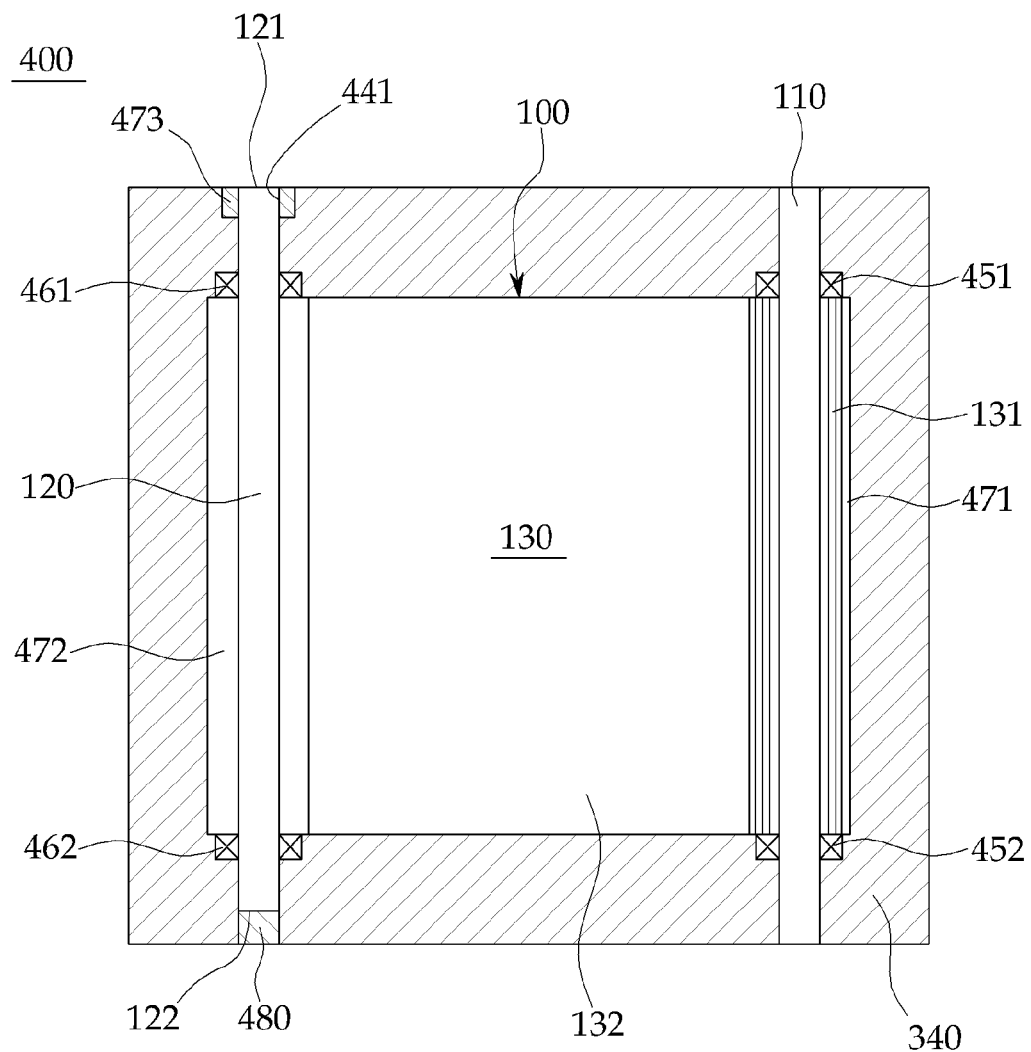
FIG. 4A and 4B are a longitudinal sectional view and cross-sectional view, respectively, of a battery according to another illustrative embodiment.
Figure 4B:
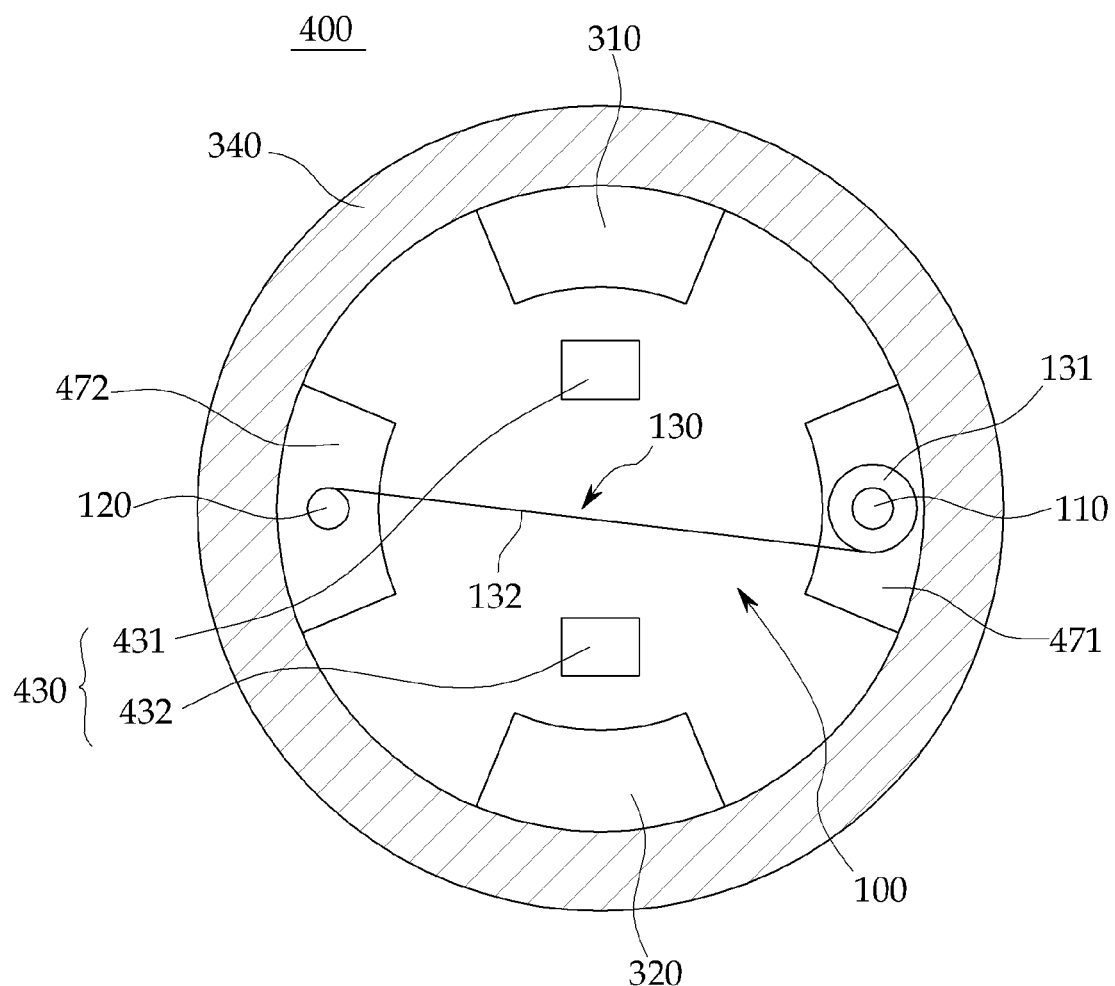

FIG. 4A and 4B are a longitudinal sectional view and cross-sectional view of a battery in accordance with another illustrative embodiment. A battery 400 may further include one or more of pairs of bearings 451, 452 and 461, 462, first to third seals 471 to 473, a rotating device 480, an opening 441, and a sensor 430, in addition to cathode 310, anode 320, separator 100, and case 340. The same elements as those of FIGS. 1, 2A, 2B, and 3 are denoted as the same reference numerals as FIGS. 1, 2A, 2B, and 3 and explanations on the same elements will be omitted for the simplicity of the description.

FIG. 4A illustrates bearings 451 and 452 configured to surround top and bottom portions of first roller 110, and bearings 461 and 462 configured to surround top and bottom portions of second roller 120. In one embodiment, bearings 451 and 452 may be placed coaxially to first roller 110 in top and bottom portions of case 340, respectively, as shown in FIG. 4A. Also, bearings 461 and 462 may be placed coaxially to second roller 120 in top and bottom portions of case 340, respectively, as shown in FIG. 4A. For example, each of bearings 451, 452, 461, and 462 may include an outer rim fixed to case 340 and an inner rim rotatably supported by the outer rim. The outer rims may be fixed to case 340 such that the outer rims do not rotate. The outer rims may be inserted into recesses provided within case 340. The inner rims of bearings 451, 452, 461, and 462 can rotate in respect to the outer rims of bearings 451, 452, 461, and 462. In one embodiment, first roller 110 may be fitted into the inner rims of bearings 451 and 452 and second roller 120 may be fitted into the inner rims of bearings 461 and 462 such that the inner rims may rotate together with first and second roller 110 or 120 during the rotation of rollers 110 and 120. Accordingly, first and second rollers 110 and 120 can be rotatably supported by bearings 451, 452, 461, and 462, and case 340.

FIG. 4 further illustrates first seal 471 to prevent the electrolyte contained in case 340 from passing through between first roller 110 and case 340. In one embodiment, first seal 471 may be configured to surround first roller 110 and rolled portion 131 of porous film 130. For example, first seal 471 may be an arc-shaped container (See FIG. 4B). First seal 471 may have top and bottom openings on top and bottom surfaces of first seal 471. Therefore, first roller 110 may be inserted in first seal 471 through the top and bottom openings.

In another embodiment, an exterior surface of first seal 471 facing case 340 may contact case 340 such that there is no gap between first seal 471 and case 340. Therefore, the electrolyte cannot pass through between first seal 471 and case 340.

Since a portion of first roller 110 which is wound with rolled portion 131 of porous film 130 may be surrounded by first seal 471, first seal 471 may prevent rolled portion 131 of porous film 130 from contacting the electrolyte within case 340. Thus, rolled portion 131 may be prevented from participating in electrochemical reactions between cathode 310 and anode 320 and from contacting pollutants included in the electrolyte.

In another embodiment, first seal 471 may have a slit in a side surface of first seal 471. Unrolled portion 132 of porous film 130 can pass through the slit of first seal 471 and can be connected with second roller 120.

FIG. 4A further illustrates second seal 472 to prevent the electrolyte contained in case 340 from passing through between second roller 120 and case 340. In one embodiment, second seal 472 may be configured to surround second roller 120. For example, second seal 472 may be an arc-shaped container as first seal 471 (See FIG. 4B). Similarly to first seal 471, second seal 472 may have top and bottom openings on top and bottom surfaces of second seal 472 to receive second roller 120 through the openings of second seal 472.

In another embodiment, an exterior surface of second seal 472 facing case 340 may contact case 340 such that there is no gap between second seal 472 and case 340. Since there is no gap between first and second seals 471 and 472 and case 340, the electrolyte can only pass through unrolled portion 132 of porous film 130, thereby preventing the electrolyte from directly connecting the cathode with the anode.

In another embodiment, second seal 472 may have a slit in a side surface of second seal 472. Unrolled portion 132 of porous film 130 can pass through the slit of second seal 472. Unrolled portion 132 passed through the slit of second seal 472 can be wound around second roller 120.

FIG. 4A still further illustrates rotating device 480 operably connected to second roller 120 to rotate second roller 120. In one embodiment, rotating device 480 may be placed on one end 122 of second roller 120 and mechanically coupled to second roller 120. In another embodiment, rotating device 480 may be placed on the other end (e.g., 121) or both ends 121 and 122, as described above.

Rotating device 480 may convert electric force into mechanical rotating force and provide the mechanical rotating force to rotate second roller 120. Rotating device 480 may be electrically connected to cathode 310 and anode 320 of battery 400, and, thus, rotating device 480 may be powered by battery 400. Alternatively, rotating device 480 may be electrically connected to an external power source.

For example, rotating device 480 may have a shaft (not shown) extending longitudinally from rotating device 480. The shaft may be rotatably supported by a bearing included in rotating device 480. Rotating device 480 may be supplied with the electric force and the shaft of rotating device 480 may rotate by the force provided through the conversion from the electric force to the mechanical rotating force in rotating device 480. The shaft of rotating device 480 may be coupled with second roller 120 to rotate second roller.

FIG. 4A still further illustrates opening 441 formed on case 340. In one embodiment, opening 441 may be configured to expose one end (e.g., 121) of second roller 120 to an outside. End 121 of second roller 120 may be configured to receive a torque applied from an outside to rotate second roller 120. End 121 may have a recess capable of being engaged with external tool, such as a screwdriver. Users or external equipments can engage the external tool with the recess of second roller 120 through opening 441 of case 340 and rotate second roller 120 about its central axis to roll up porous film 130 by rotating the tool. Although FIG. 4A illustrates that opening 441 is formed on end 121 of second roller 120, it is apparent to one of skilled in the art that opening 441 may be formed on the other end, i.e., end 122 of second roller 120 or that two openings may be formed on both ends of second roller 120 in case 340 where both ends of second roller 120 receives the torque applied from an outside.

FIG. 4A still further illustrates third seal 473 to prevent the electrolyte included in case 340 from leaking through opening 441. Third seal 473 may be inserted into opening 441 and surround end 121 of second roller 120. Third seal 473 may be a rubber or plastic packing or bearing-type seal which is configured to allow the rotation of second roller 120.

FIG. 4B illustrates sensor 430 configured to detect a clogging value for unrolled portion 132 of porous film 130 placed between first roller 110 and second roller 120. Although it is illustrated that sensor 430 is provided within case 440 in FIG. 5B, sensor 530 may be provided outside case 340.

In one embodiment, a clogging value for unrolled portion 132 may be a difference value between a desired voltage for battery 400 and a voltage generated by battery 400. For example, the desired voltage may be a voltage generated by battery 400 in an initial state of battery 400 which is unused. If pores in unrolled portion 132 of porous film 130 clogs during using battery 400, the voltage generated by battery 400 becomes less than the desired voltage for battery 400 although battery 400 is fully recharged. Then, the difference value between the desired voltage for battery 400 and the voltage generated by battery 400 becomes large. Sensor 430 may detect whether the difference value exceeds a reference value. The reference value may be in the range of 10% to 40%, or 20% to 30% of the desired voltage.

In another embodiment, a clogging value for unrolled portion 132 may be a difference value between a first electric current and a second electric current. The first electric current is an electric current between cathode 310 and separator 100 and the second electric current is an electric current between anode 320 and separator 100. In the present embodiment, sensor 430 may be provided within case 340. Sensor 430 may include a first sensing element 431 provided between cathode 310 and separator 100 and a second sensing element 432 provided between anode 320 and separator 100. First and second sensing element 431 and 432 may be fixed to and supported by case 340 and electrically connected to each other. First sensing element 431 may detect the first electric current and second sensing element 432 may detect the second electric current. If pores in unrolled portion 132 of porous film 130 clogs, it is difficult for charges from cathode 310 or anode 320 to pass through the pores in unrolled portion 132. Then, the difference value between the first electric current and the second electric current becomes large. Sensor 430 may detect whether the difference value between the first electric current and the second electric current exceeds a reference value by an amount, for example, 120% to 180%, or 140% to 170% of the reference value. The reference value may be an initial difference value between the first electric current and the second electric current in an unused battery.

Separator 100 may be configured such that second roller 120 rolls up unrolled portion 132 of porous film 130 when sensor 430 detects that the clogging value exceeds the reference value. When sensor 430 detects that the clogging value exceeds the reference value, sensor 430 may control rotating device 480 to rotate such that second roller 120 rolls up unrolled portion 132 of porous film 130. Rotating device 480 may rotate second roller 120 connected to rotating device 480 and first roller 110 may be rotated by second roller 120 through porous film 130. As described above for FIG. 3, according to the cooperative rotations of first and second rollers 110 and 120, unrolled portion 132 of porous film 130 may be replaced with a new portion of porous film 130 supplied from first roller 110. The above-described operation may be repeated whenever the clogging of unrolled portion 132 occurs.

Although it is illustrated that the number of each of separator 100, cathode 310, anode 320, and first and second seals 471 and 472 is one in FIGS. 4A and 4B, one of skill in the art could understand that multiple separators 100, cathodes 310, anodes 320, or first and second seals 471 and 472 can be provided within case 340.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an"

should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A separator assembly for a battery that includes an anode and a cathode, the separator assembly comprising:
   a porous film that has a first end and a second end opposite the first end;
   first and second rollers; and
   a sensor configured to determine a performance of the porous film, wherein the sensor is positioned between the porous film and one of the cathode and the anode and is configured to generate an output associated with the performance of the porous film;
   wherein a portion of the porous film that includes the first end is wound on the first roller and the second end is coupled to the second roller,
   wherein the first roller is configured to rotate to unroll the porous film; and
   wherein the second roller is operative to rotate to move the porous film relative to the anode and the cathode based on the output of the sensor.

2. The separator assembly of claim 1, wherein the first and second ends of the porous film are fixed to the first and second rollers, respectively.

3. The separator assembly of claim 1, wherein the first and second rollers cooperatively rotate such that the porous film is unwound from the first roller, wherein the first and second rollers are made of an electrochemical resistant material, respectively, and wherein the chemical resistant material comprises a steel, an aluminum, a plastic, or a composite material.

4. The separator assembly of claim 1, wherein the second roller is configured to rotate to roll up the porous film and wherein a length of the porous film rolled by the second roller is the same as a distance between the first and second rollers.

5. The separator assembly of claim 1, wherein the second roller is configured to rotate in a same direction as a rotary direction of the first roller to roll up the film.

6. The separator assembly of claim 1, wherein the second roller is configured to rotate in an opposite direction to a rotary direction of the first roller to roll up the film.

7. The separator assembly of claim 1, further comprising a rotating device operably coupled to the second roller to rotate the second roller with respect to the porous film.

8. The separator assembly of claim 1, wherein the second roller has one end configured to receive a torque applied from an outside to rotate the second roller.

9. The separator assembly of claim 1, wherein the first and second rollers are made of an electrochemical resistant material, respectively.

10. The separator assembly of claim 9, wherein the chemical resistant material comprises a steel, an aluminum, a plastic, or a composite material.

11. The separator assembly of claim 1, wherein the porous film is made of at least one of a nonwoven fiber, a polymer, and an inorganic composite.

12. A battery comprising:
   a cathode and an anode;
   a separator to separate the cathode and the anode, the separator comprising:
      a porous film;
      a first roller; and
      a second roller; and
   a sensor positioned between the separator and one of the cathode and the anode;
   wherein:
      the first roller is associated with a first end of the porous film and the second roller is associated with a second end of the porous film,
      the first roller is wound with a portion of the porous film that includes the first end and is configured to rotate to unroll the porous film, and the second roller is coupled to the second end and is configured to rotate to roll up the porous film and move the porous film relative to the cathode and the anode.

13. The battery of claim 12, further comprising a rotating device operably coupled to the second roller to rotate the second roller with respect to the porous film.

14. The battery of claim 12, wherein the sensor is configured to detect a clogging value for an unrolled portion of the porous film placed between the first roller and the second roller.

15. The battery of claim 14, wherein the clogging value is a difference value between a target voltage for the battery and a voltage generated by the battery.

16. The battery of claim 14, wherein the second roller is configured to roll up the porous film in response to detection by the sensor that the clogging value exceeds a reference value.

17. The battery of claim 12, further comprising a case to contain the cathode, the anode, and the separator.

18. The battery of claim 17, wherein the case comprises a first seal and a second seal to surround the first roller and the second roller, respectively, to prevent an electrolyte contained in the case from passing through between the first and second rollers and the case.

19. The battery of claim 17, wherein the case has an opening through which one end of the second roller is exposed to an outside.

20. The battery of claim 19, wherein the case further comprises a third seal to prevent an electrolyte contained in the case from leaking through the opening.

21. A battery comprising:
a cathode;
an anode;
a separator,
wherein the separator:
includes a porous film that includes moveable first and second portions, and
is configured to move relative to the cathode and the anode to selectively position either the first portion or the second portion between the cathode and the anode; and
a sensor configured to generate an output associated with a performance of the porous film,
wherein the separator is configured to selectively position the porous film based on the output of the sensor; and
wherein the sensor is positioned between the separator and at least one of the cathode and the anode.

22. The battery of claim 21, further comprising:
a first roller, wherein a first end of the porous film is associated with the first roller.

23. The battery of claim 22, further comprising a second roller,
wherein the second portion is initially rolled up on one of the first roller and the second roller and the first portion is positioned between the cathode and the anode,
wherein the first roller and the second roller are configured to rotate to replace the first portion with the second portion such that the second portion is positioned between the cathode and the anode and the first portion is at least partially rolled up on one of the first and second rollers.

24. The battery of claim 21, wherein the output of the sensor includes a voltage generated by the battery, wherein a selective positioning of the separator is determined according to a difference between a target voltage and the output of the sensor.

25. The battery of claim 21, wherein the sensor is configured to determine a current of the battery, wherein a selective positioning of the porous film is determined according to a difference between a first current and a second current.

26. The battery of claim 25, wherein the first current is between the cathode and the separator and the second current is between the anode and the separator.

27. The battery of claim 21 further comprising a case configured to contain the cathode, the anode and the separator, wherein the sensor is disposed inside the case or outside the case.

* * * * *

UNITED STATES PATENT AND TRADEMARK OFFICE
CERTIFICATE OF CORRECTION

PATENT NO. : 8,703,313 B2  
APPLICATION NO. : 12/762500  
DATED : April 22, 2014  
INVENTOR(S) : Sohn Page 1 of 1

It is certified that error appears in the above-identified patent and that said Letters Patent is hereby corrected as shown below:

In the Specification

In Column 1, Line 22, delete "FIGS. 2C" and insert -- FIG. 2C --, therefor.

In Column 1, Line 25, delete "FIG." and insert -- FIGS. --, therefor.

In Column 2, Line 55, delete "portion 132" and insert -- portion 132. --, therefor.

In Column 5, Lines 51-52, delete "rolled portion 132'" and insert -- unrolled portion 132' --, therefor.

In the Claims

In Column 14, Line 36, in Claim 27, delete "claim 21 further" and insert -- claim 21, further --, therefor.

Signed and Sealed this  
Second Day of December, 2014

Michelle K. Lee  
*Deputy Director of the United States Patent and Trademark Office*